US011523144B2

(12) United States Patent
Sugimoto

(10) Patent No.: US 11,523,144 B2
(45) Date of Patent: Dec. 6, 2022

(54) COMMUNICATION APPARATUS, COMMUNICATION METHOD, AND COMPUTER-READABLE STORAGE MEDIUM

(71) Applicant: CANON KABUSHIKI KAISHA, Tokyo (JP)

(72) Inventor: Shun Sugimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/930,365

(22) Filed: Jul. 16, 2020

(65) Prior Publication Data
US 2020/0351525 A1 Nov. 5, 2020

Related U.S. Application Data

(63) Continuation of application No. PCT/JP2019/002198, filed on Jan. 24, 2019.

(30) Foreign Application Priority Data

Feb. 8, 2018 (JP) .............................. JP2018-021177

(51) Int. Cl.
*H04N 21/218* (2011.01)
*H04N 21/239* (2011.01)
(Continued)

(52) U.S. Cl.
CPC ..... *H04N 21/21805* (2013.01); *H04N 13/117* (2018.05); *H04N 21/2393* (2013.01); *H04N 21/6587* (2013.01)

(58) Field of Classification Search
CPC .......... H04N 21/21805; H04N 13/117; H04N 21/2393; H04N 21/6587; H04N 21/26258;
(Continued)

(56) References Cited

U.S. PATENT DOCUMENTS

2018/0048727 A1* 2/2018 Suzuki ............... H04N 21/6587
2019/0104316 A1* 4/2019 Da Silva Pratas Gabriel ............
H04N 21/6587
(Continued)

FOREIGN PATENT DOCUMENTS

JP      2015-187797 A   10/2015
WO      2017/195513 A1  11/2017

OTHER PUBLICATIONS

Ayano Tatematsu et al., "Influence of Network Delay on Quality of Experience in Free-Viewpoint Video Transmission," Image Laboratory, vol. 23, No. 7, pp. 37-44, ISSN0915-6755 (Jul. 10, 2012).
(Continued)

*Primary Examiner* — Alazar Tilahun
(74) *Attorney, Agent, or Firm* — Venable LLP

(57) ABSTRACT

A communication apparatus for transmitting a virtual viewpoint video receives an acquisition request for a virtual viewpoint video, acquires viewpoint position information indicating a viewpoint position for the virtual viewpoint video from an apparatus that made the acquisition request, and transmits a virtual viewpoint video segment corresponding to the viewpoint position information to the apparatus that made the acquisition request. The virtual viewpoint video is video data in a format in which a video from any viewpoint position in a three-dimensional space can be rendered, and the virtual viewpoint video segment is generated by encoding the virtual viewpoint video as a two-dimensional video based on the viewpoint position information.

13 Claims, 11 Drawing Sheets

(51) Int. Cl.
*H04N 13/117* (2018.01)
*H04N 21/6587* (2011.01)

(58) Field of Classification Search
CPC ........... H04N 21/8456; H04N 21/2668; H04N 21/4728; G06F 13/00; G06T 19/00
See application file for complete search history.

(56) References Cited

U.S. PATENT DOCUMENTS

2019/0149807 A1  5/2019  Akao et al.
2019/0174150 A1* 6/2019  D'Acunto ........ H04N 21/43072
2019/0311526 A1* 10/2019 Sugio ........................ G06T 9/00

OTHER PUBLICATIONS

PCT International Search Report dated Apr. 15, 2019, in International Application No. PCT/JP2019/002198.

\* cited by examiner

COMMUNICATION APPARATUS, COMMUNICATION METHOD, AND COMPUTER-READABLE STORAGE MEDIUM

CROSS-REFERENCE TO RELATED APPLICATIONS

This application is a Continuation of International Patent Application No. PCT/JP2019/002198, filed Jan. 24, 2019, which claims the benefit of Japanese Patent Application No. 2018-021177 filed Feb. 8, 2018, both of which are hereby incorporated by reference herein in their entirety.

BACKGROUND OF THE INVENTION

Field of the Invention

The present invention relates to virtual viewpoint videos.

Background Art

In recent years, attention has been paid to a technique for videos called, for example, virtual viewpoint videos and free viewpoint videos, (hereinafter, virtual viewpoint videos).

PTL1 discloses an encoder for generating a video in which a user can freely move their viewpoint and a player for such a video.

For example, in a case where a virtual viewpoint video is generated based on a virtual viewpoint in a user terminal, data (e.g., a three-dimensional geometric model and texture data of an object) necessary to generate the virtual viewpoint video can be held in advance. However, if such data is acquired from a server in advance, an enormous amount of data may be transmitted from the server.

CITATION LIST

Patent Literature

PTL1: Japanese Patent Laid-Open No. 2015-187797

SUMMARY OF THE INVENTION

The present invention suppresses an increase in amount of transmission data related to a virtual viewpoint video.

According to a first aspect of the present invention, there is provided a communication apparatus for transmitting a virtual viewpoint video comprises a receiving unit configured to receive an acquisition request for a virtual viewpoint video, an acquiring unit configured to acquire viewpoint position information indicating a viewpoint position for the virtual viewpoint video from an apparatus that made the acquisition request, and a transmitting unit configured to transmit a virtual viewpoint video segment corresponding to the viewpoint position information to the apparatus that made the acquisition request.

According to a second aspect of the present invention, there is provided a communication apparatus for virtual viewpoint video reception, comprising: a generating unit configured to generate a virtual viewpoint video segment acquisition request based on description data describing information for acquiring a virtual viewpoint video; an acquiring unit configured to acquire viewpoint position information indicating a viewpoint position for the virtual viewpoint video; a transmitting unit configured to transmit the virtual viewpoint video segment acquisition request and the viewpoint position information to an apparatus for transmitting a virtual viewpoint video; and a receiving unit configured to receive a virtual viewpoint video segment from the apparatus for transmitting a virtual viewpoint video.

Further features of the present invention will become apparent from the following description of exemplary embodiments with reference to the attached drawings.

DESCRIPTION OF THE EMBODIMENTS

The present invention will be described based on its preferred embodiments in detail below with reference to the accompanying drawings. Note that configurations illustrated in the following embodiments are merely examples and the present invention is not limited to the configurations that are illustrated or the like.

First Embodiment

In a first embodiment, a communication system will be described that includes a communication apparatus capable of transmitting a video generated corresponding to a viewpoint position freely moved by a user on a reception side and a communication apparatus capable of receiving the transmitted video and playing the received video. In the following description, the communication apparatus on a video transmission side will be referred to as a transmission apparatus, and the communication apparatus on the reception side will be referred to as a reception apparatus. A video to be generated corresponding to a viewpoint position that a user freely moves is called a virtual viewpoint video or a free viewpoint video. In the present embodiment, such a video is referred to as a virtual viewpoint video. In this embodiment, a case where a user can freely move a virtual viewpoint will be mainly described. Virtual viewpoint movement may be subject to any limitation.

Figure 1:
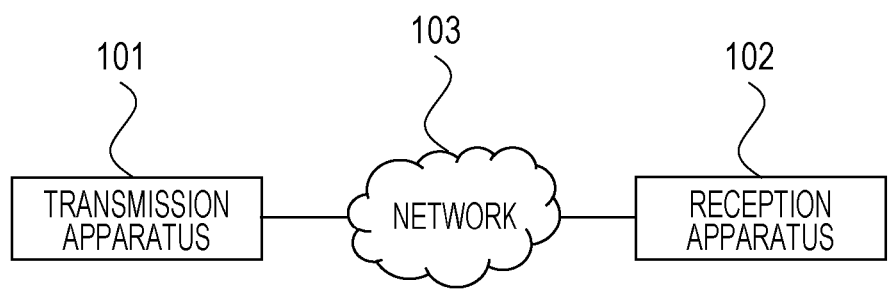
FIG. 1 is a diagram illustrating a system configuration of a communication system.

FIG. 1 is a diagram illustrating an exemplary configuration of the communication system in the embodiment.

A transmission apparatus 101 holds video data from which a virtual viewpoint video can be generated, and functions as a server apparatus that provides a predetermined video transmission service. The server apparatus may include a digital camera, a digital video camera, a network camera, a projector, a smartphone, and a personal computer (PC) that take a video.

A reception apparatus 102 functions as a client apparatus for a virtual viewpoint video. The client apparatus may be any of, for example, a digital television, a tablet, a smartphone, a PC, and a head mounted display (HMD) that have a display function and a communication function.

The transmission apparatus 101 and the reception apparatus 102 are connected to a network 103. The network 103 may be, for example, a local area network (LAN), a wide area network (WAN), or a network based on Long Term Evolution (LTE), which is a public mobile communication network, or may also be a combination of these networks.

Figure 2:
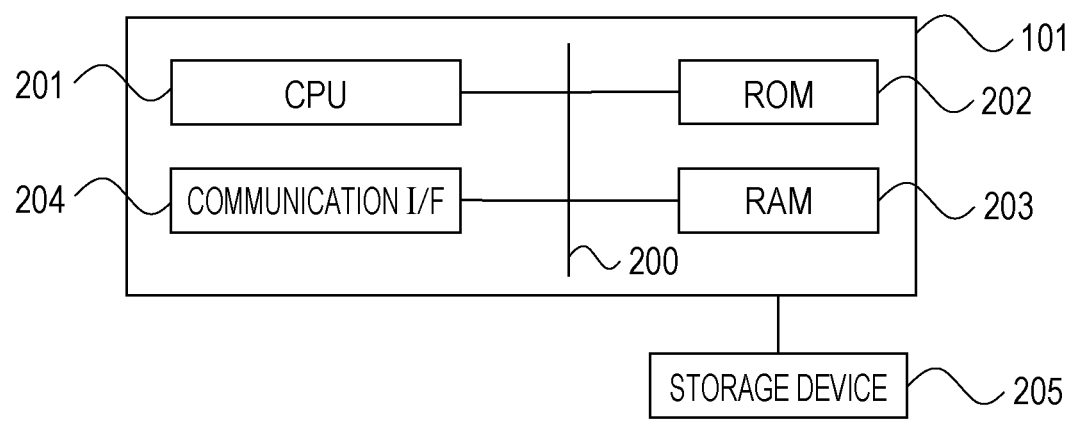
FIG. 2 is a block diagram illustrating an exemplary hardware configuration of a transmission apparatus.

FIG. 2 is a diagram illustrating an exemplary hardware configuration of the transmission apparatus 101.

A system bus 200 connects components of the transmission apparatus 101 and serves as a transfer path for various types of data. The system bus 200 is connected to, for example, a central processing unit (CPU) 201, a read-only memory (ROM) 202, a random access memory (RAM) 203, and a communication I/F 204.

The CPU 201 controls the components in a centralized manner to control the entire transmission apparatus 101.

The ROM 202 stores a control program, which is executed by the CPU 201, or the like.

The RAM 203 functions as a main memory or a work area or the like of the CPU 201, and temporarily stores a program, data, or received packet data, or the like.

The communication I/F 204 is an interface through which communication packets are transmitted and received over the network 103. Examples of the communication I/F 204 include a wireless LAN interface, a wired LAN interface, and a public mobile communication interface. The communication I/F 204 may be any interface other than the above-described interfaces.

A storage device 205 is a storage device that stores video data, from which a virtual viewpoint video can be generated, and generated virtual viewpoint video data, and the like. Examples of the storage device include a hard disk drive (HDD) and a solid state drive (SSD). Although FIG. 2 illustrates the storage device 205 disposed outside the transmission apparatus 101, the storage device 205 may be incorporated in the transmission apparatus 101. The storage device 205 may be an internal storage device incorporated in an image capturing apparatus, such as a camera, for capturing video data from which a virtual viewpoint video can be generated. The video data stored in the storage device 205 may be accumulated video data generated in advance or real-time video data from an image capturing apparatus.

Figure 3:
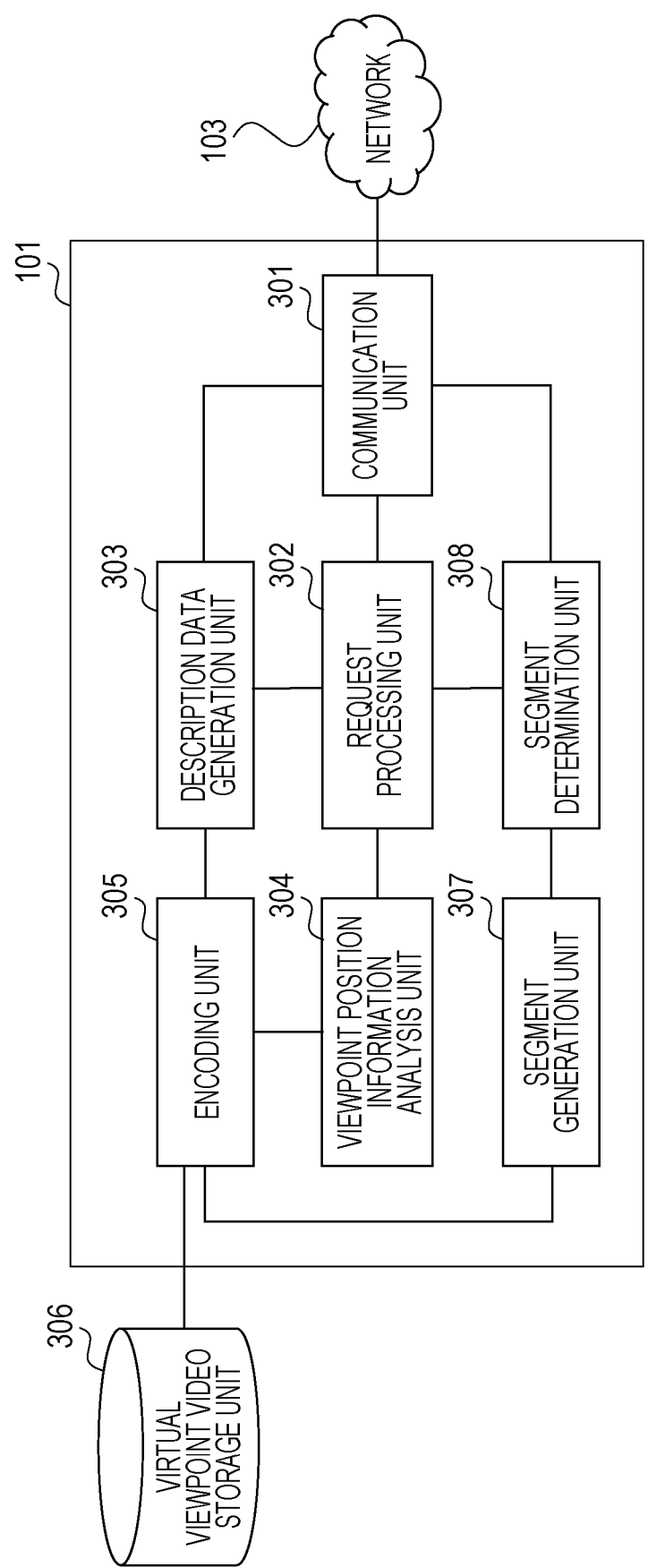
FIG. 3 is a block diagram illustrating an exemplary functional configuration of the transmission apparatus.

FIG. 3 is a diagram illustrating an exemplary configuration of functional blocks of the transmission apparatus 101. Note that functions of the following functional blocks in the embodiment are implemented by executing software programs, by the CPU 201, that are stored in the ROM 202 and the RAM 203. Part or all of the functional blocks may be implemented by hardware.

A communication unit 301 performs protocol processing on communication packets received and to be transmitted through the communication I/F 204. The communication unit 301 transfers received various request packets to a request processing unit 302, and transmits description data generated by a description data generation unit 303 and a segment determined by a segment determination unit 308 to the network 103. In the embodiment, Transmission Control Protocol (TCP)/Internet Protocol (IP) and Hypertext Transfer Protocol (HTTP), which are examples, are used.

The request processing unit 302 processes a request packet received by the communication unit 301. Examples of the request packet include an acquisition request packet for description data that describes information for acquiring a virtual viewpoint video and a segment acquisition request packet for acquiring a virtual viewpoint video segment. Upon receiving a description data acquisition request packet, the request processing unit 302 instructs the description data generation unit 303 to generate and transmit description data. Upon receiving a segment acquisition request packet, the request processing unit 302 instructs the segment determination unit 308 to determine and transmit a segment corresponding to a segment requested to be acquired. In a case where the segment acquisition request packet contains viewpoint position information, which will be described later, the request processing unit 302 instructs a viewpoint position information analysis unit 304 to analyze the viewpoint position information. It is assumed in the embodiment that viewpoint position information is contained in a segment acquisition request packet. The viewpoint position information and the segment acquisition request packet may be contained in discrete packets.

The description data generation unit 303 generates, as description data, information for acquiring a virtual viewpoint video, such as video and/or audio information (e.g., encoding information, an image size), unit time segment information, and a URL for acquiring a segment. For example, Media Presentation Description (MPD) in MPEG-DASH and Playlists in HLS correspond to the above-described description data. In the embodiment, a case where description data is based on MPEG-DASH will be described as an example. Description data may be based on any other scheme or may not be based on HTTP.

The viewpoint position information analysis unit 304 analyzes viewpoint position information contained in a segment acquisition request packet. Examples of the viewpoint position information include information indicating a viewpoint position, a line-of-sight direction at the viewpoint position, and a focal length or the like in a three-dimensional space. The viewpoint position information does not need to be a single piece of information. The viewpoint position information may contain a start viewpoint position and an end viewpoint position in a duration of a virtual viewpoint video segment. The viewpoint position information analysis unit 304 inputs a result of analysis of the viewpoint position information to an encoding unit 305, and instructs the encoding unit 305 to encode a virtual viewpoint video based on the viewpoint position information.

The encoding unit 305 acquires, from a virtual viewpoint video storage unit 306 described later, virtual viewpoint video data based on the input viewpoint position information, and performs two-dimensional video encoding for the acquired virtual viewpoint video data. In a case where the viewpoint position information includes a plurality of pieces of information indicating, such as a start viewpoint position and an end viewpoint position, the encoding unit 305 acquires virtual viewpoint video data corresponding to viewpoint movement based on these pieces of information from the virtual viewpoint video storage unit 306 and encodes the data. Thus, the encoded virtual viewpoint video data based on the viewpoint movement is obtained.

For the viewpoint movement, the viewpoint may be moved smoothly rather than abruptly to enhance a user's sense of immersion in the virtual viewpoint video. For example, if a virtual viewpoint video segment has a segment length of one second, a frame rate of 30 fps (frames per second), and a viewpoint movement distance of 30, the viewpoint can be moved by one every frame to provide smooth viewpoint movement. A viewpoint movement time does not necessarily have to be a segment length. The viewpoint movement time may be shorter than the segment length or may be longer than the segment length such that the viewpoint is moved over a plurality of segments. A viewpoint movement speed does not need to be constant. The viewpoint movement speed may be gradually increased and gradually reduced by adding, for example, information on a viewpoint movement acceleration to viewpoint information. Examples of encoding methods include H.264 and H.265. Any other method may be used. The encoding unit 305 inputs, as information for encoding, information on, for example, an encoding method, an image size, and a frame rate, to the description data generation unit 303.

The virtual viewpoint video storage unit 306 stores virtual viewpoint video data in the storage device 205. For a format of virtual viewpoint video data to be stored, any data format may be used as long as rendering can be performed based on, for example, a viewpoint position in a three-dimensional space, a line-of-sight direction at the viewpoint position, and a focal length, in order to generate a video from any viewpoint. The virtual viewpoint video data to be stored may be uncompressed video data captured by a plurality of image capturing apparatuses.

A segment generation unit 307 generates, as a unit time segment or a virtual viewpoint video segment, virtual viewpoint video data encoded by the encoding unit 305. The segment generation unit 307 may generate a virtual video segment as a container file in, for example, Fragmented MP4 format or TS format, or in any other format.

The segment determination unit 308 determines, from among segments generated by the segment generation unit 307, a segment to be transmitted based on viewpoint position information. The encoding unit 305 may perform encoding with a plurality of video sizes and a plurality of video qualities. The segment determination unit 308 may dynamically change a segment to be transmitted based on, for example, conditions of the network 103, a state of the transmission apparatus 101, and a state of the reception apparatus 102. If the request processing unit 302 receives viewpoint position information from the reception apparatus 102 and a virtual viewpoint video segment requested in advance and encoded in association with a viewpoint position indicated by the received information is prepared, the encoding unit 305 does not need to encode data. In this case, the segment determination unit 308 may select and transmit the prepared virtual viewpoint video segment.

Figure 4:
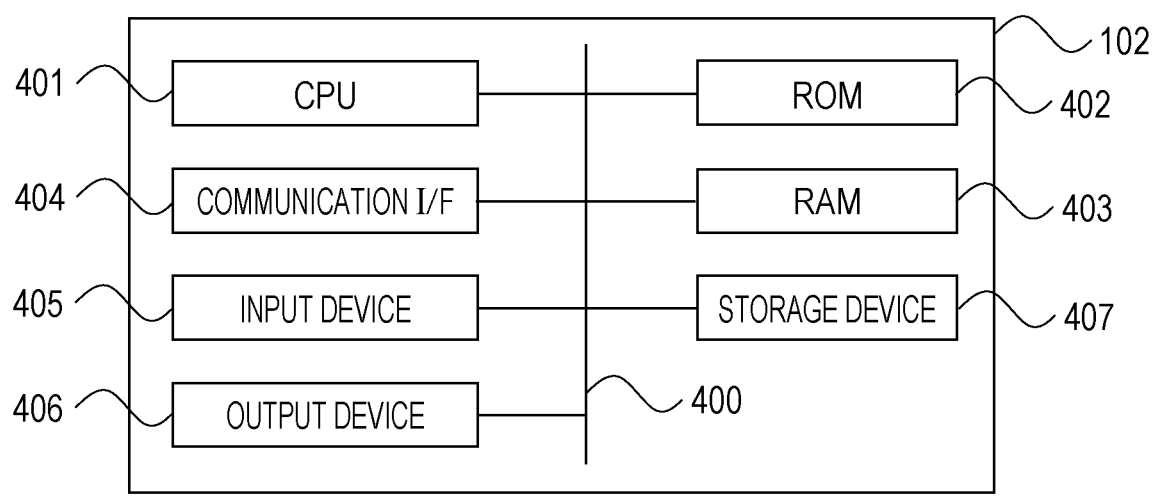
FIG. 4 is a block diagram illustrating an exemplary hardware configuration of a reception apparatus.

FIG. 4 is a diagram illustrating an exemplary hardware configuration of the reception apparatus 102.

A system bus 400 connects components of the reception apparatus 102 and serves as a transfer path for various types of data. The system bus 400 is connected to, for example, a CPU 401, a ROM 402, a RAM 403, a communication I/F 404, an input device 405, an output device 406, and a storage device 407.

The CPU 401 controls the components in a centralized manner to control the entire reception apparatus 102.

The ROM 402 stores, for example, a control program that is executed by the CPU 401.

The RAM 403 functions as, for example, a main memory or a work area of the CPU 401, and temporarily stores, for example, a program, data, or received packet data.

The communication I/F 404 is an interface through which communication packets are transmitted and received over the network 103. Examples of the communication I/F 404 include a wireless LAN interface, a wired LAN interface, and a public mobile communication interface. The communication I/F 404 may be any interface other than the above-described interfaces.

The input device 405 is a device that receives a user input. Examples of the input device include a touch panel, a keyboard, a mouse, and buttons.

The output device 406 is a device that outputs a virtual viewpoint video and information processed in the reception apparatus 102. Examples of the output device include devices having a display function, such as a display, a digital television, a touch panel, and a projector.

The storage device 407 is a storage device that stores, for example, received virtual viewpoint video segment data and decoded virtual viewpoint video data. Examples of the storage device include an HDD and an SSD.

Although the embodiment has been described with an exemplary case where the input device 405, the output device 406, and the storage device 407 are arranged in the reception apparatus 102, these devices may be arranged outside the reception apparatus 102.

Figure 5:
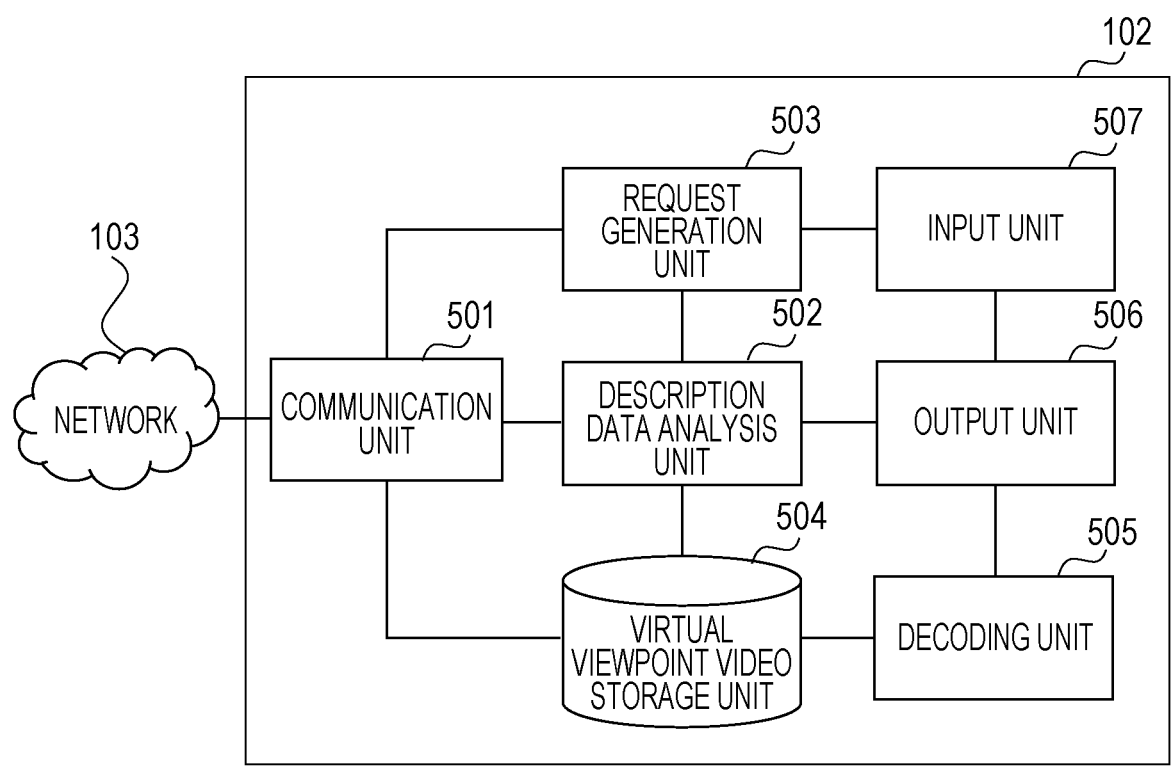
FIG. 5 is a block diagram illustrating an exemplary functional configuration of the reception apparatus.

FIG. 5 is a diagram illustrating an exemplary configuration of functional blocks of the reception apparatus 102. Note that functions of the following functional blocks in the embodiment are implemented by software programs, stored in the ROM 402 and the RAM 403, running on the CPU 401. Part or all of the functional blocks may be implemented by hardware.

A communication unit 501 performs protocol processing on communication packets received and to be transmitted through the communication I/F 404. The communication unit 501 transfers description data received from the transmission apparatus 101 to a description data analysis unit 502, and sends a virtual viewpoint video segment to a virtual viewpoint video storage unit 504 such that the video segment is stored in the storage unit. Furthermore, the communication unit 501 transmits various request packets, received from a request generation unit 503, to the transmission apparatus 101 over the network 103. As described with respect to the transmission apparatus 101, TCP/IP and HTTP are used in the embodiment. Any other protocol may be used.

The description data analysis unit 502 analyzes description data transmitted from the transmission apparatus 101 and received by the communication unit 501. As described above, the description data describes, for example, a URL for acquiring a virtual viewpoint video segment and segment information. The description data analysis unit 502 analyzes the description data to extract these pieces of information, and sends the information as an analysis result to the request generation unit 503. For example, the information indicating the analysis result may be sent to an output unit 506 and be displayed such that a user can view details of the analysis result.

The request generation unit 503 generates various request packets to be transmitted to the transmission apparatus 101. The request generation unit 503 generates a request packet for acquiring description data and a request packet for acquiring a virtual viewpoint video segment described in description data. Furthermore, the request generation unit 503 stores viewpoint position information, input from an input unit 507, in a virtual viewpoint video segment request packet. The viewpoint position information may be generated as an independent packet without being stored in a segment acquisition request packet or may be stored in a description data acquisition request packet.

The virtual viewpoint video storage unit 504 stores a virtual viewpoint video segment transmitted from the transmission apparatus 101 and received by the communication unit 501 in the storage device 407. The virtual viewpoint video segment may be decoded by a decoding unit 505 and then be stored.

The decoding unit 505 decodes a virtual viewpoint video segment transmitted from the transmission apparatus 101 and received. A decoding method that matches the encoding method used to encode a virtual viewpoint video in the encoding unit 305 of the transmission apparatus 101 is used.

The output unit 506 outputs, for example, a virtual viewpoint video decoded by the decoding unit 505 and segment information analyzed by the description data analysis unit 502 to the output device 406 to, for example, display the video and the information.

The input unit 507 processes viewpoint position information input by the user through the input device 405 and outputs the processed information to the above-described request generation unit 503. The input unit 507 may output information input by the user to the output device 406 via the output unit 506.

Figure 6:
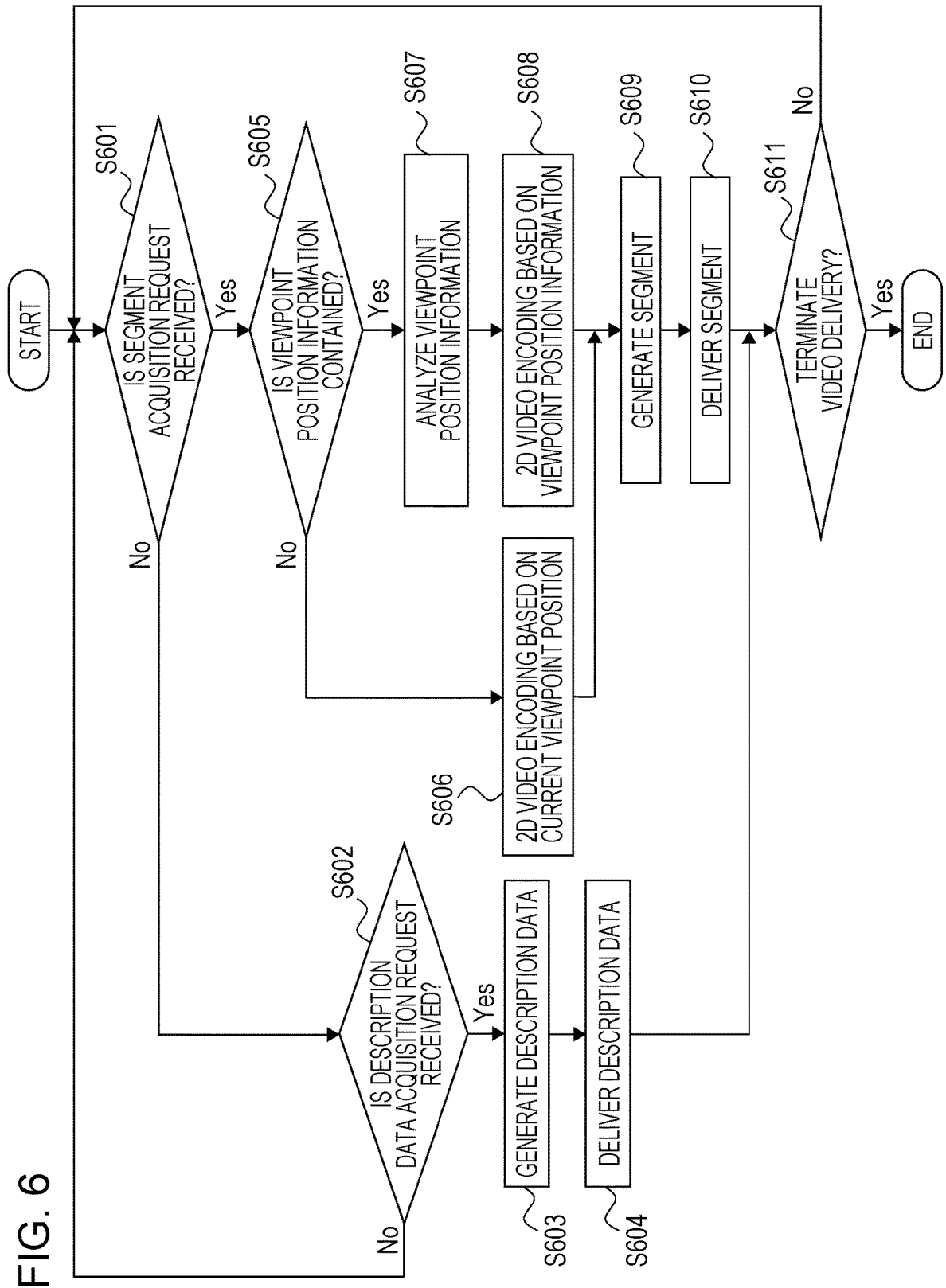
FIG. 6 is a flowchart of a virtual viewpoint video transmission process in the transmission apparatus in a first embodiment.

FIG. 6 is a flowchart illustrating a virtual viewpoint video transmission process in the transmission apparatus 101.

The CPU 201 of the transmission apparatus 101 reads a virtual viewpoint video transmission program stored in the ROM 202 and executes the program, thereby implementing the process illustrated in the flowchart of FIG. 6. In the following description, steps S601 to S611 in the flowchart of FIG. 6 will be simply referred to as S601 to S611. The program according to the embodiment may be prepared in the ROM 202, may be read from, for example, a detachable semiconductor memory, or may be downloaded over a network, such as the Internet. The same applies to other flowcharts, which will be described later.

The process illustrated in the flowchart of FIG. 6 will be described with reference to the functional blocks of the transmission apparatus 101 in FIG. 3.

In S601, the request processing unit 302 determines whether a request packet received by the communication unit 301 is a segment acquisition request packet. If the request processing unit 302 determines that it is a segment acquisition request, the process proceeds to S605. If the request processing unit 302 determines that it is not a segment acquisition request, the process proceeds to S602.

In S602, the request processing unit 302 determines whether the request packet is a description data acquisition request packet. If the request processing unit 302 determines that it is not a description data acquisition request packet, the process returns to S601. If the request processing unit 302 determines that it is a description data acquisition request packet, the process of the transmission apparatus 101 proceeds to S603, which is performed by the description data generation unit 303.

In S603, the description data generation unit 303 generates the above-described description data. After S603, the process of the transmission apparatus 101 proceeds to S604, which is performed by the communication unit 301.

In S604, the communication unit 301 transmits the description data, generated by the description data generation unit 303, to the reception apparatus 102 that is a transmission source of the description data acquisition request packet. After S604, the process of the transmission apparatus 101 proceeds to S611, which is performed by the request processing unit 302 and which will be described later.

When the process proceeds to S605, the request processing unit 302 determines whether the segment acquisition request packet contains viewpoint position information. If the request processing unit 302 determines that viewpoint position information is contained, the process of the transmission apparatus 101 proceeds to S607, which is performed by the viewpoint position information analysis unit 304. If the request processing unit 302 determines that viewpoint position information is not contained, the process of the transmission apparatus 101 proceeds to S606, which is performed by the encoding unit 305.

In S606, the encoding unit 305 performs two-dimensional video encoding based on a current viewpoint position, or the last viewpoint position of a virtual viewpoint video segment transmitted most recently to the reception apparatus 102. If the viewpoint position is not changed, two-dimensional video encoding may be performed in advance. After S606, the process of the transmission apparatus 101 proceeds to S609, which is performed by the segment generation unit 307 and which will be described later.

When the process proceeds to S607, the viewpoint position information analysis unit 304 analyzes the viewpoint position information contained in the segment acquisition request packet. After S607, the process of the transmission apparatus 101 proceeds to S608, which is performed by the encoding unit 305.

In S608, the encoding unit 305 performs two-dimensional video encoding on a virtual viewpoint video based on the viewpoint position information analyzed by the viewpoint position information analysis unit 304. After S608, the process of the transmission apparatus 101 proceeds to S609, which is performed by the segment generation unit 307.

In S609, the segment generation unit 307 generates a virtual viewpoint video segment.

Then, in S610, the communication unit 301 transmits the virtual viewpoint video segment, generated by the segment generation unit 307, to the reception apparatus 102 that is the transmission source of the segment acquisition request packet. After S610, the process of the transmission apparatus 101 proceeds to S611.

In S611, the request processing unit 302 determines whether to terminate a virtual viewpoint video transmission service. If the request processing unit 302 determines to terminate the virtual viewpoint video transmission service, the process in the flowchart of FIG. 6 is terminated. If the request processing unit 302 determines to continue the virtual viewpoint video transmission service, the process returns to S601.

Figure 7:
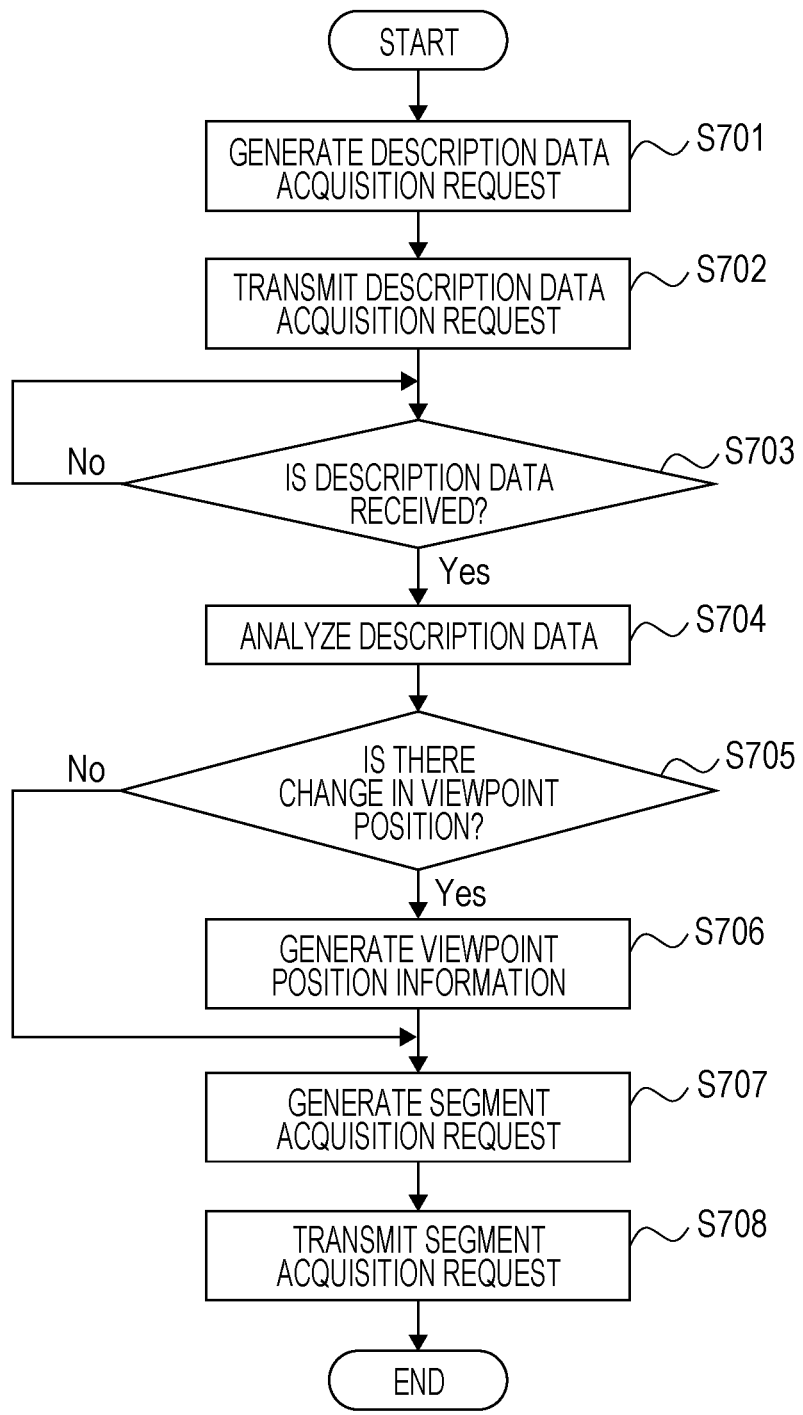
FIG. 7 is a flowchart of a virtual viewpoint video acquisition request process in the reception apparatus.

FIG. 7 is a flowchart illustrating a virtual viewpoint video acquisition request process in the reception apparatus 102.

The CPU 401 of the reception apparatus 102 reads a virtual viewpoint video acquisition request program stored in the ROM 402 and executes the program, thereby implementing the process illustrated in the flowchart of FIG. 7. The virtual viewpoint video acquisition request program may be included in the virtual viewpoint video transmission program or may be a program independent of the virtual viewpoint video transmission program. The process illustrated in the flowchart of FIG. 7 will be described below with reference to the functional blocks of the reception apparatus 102 illustrated in FIG. 5.

In S701, the request generation unit 503 generates a description data acquisition request packet to be transmitted to the transmission apparatus 101 that provides a predetermined video transmission service. After S701, the process of the reception apparatus 102 proceeds to S702, which is performed by the communication unit 501.

In S702, the communication unit 501 transmits the description data acquisition request packet, generated by the request generation unit 503, to the transmission apparatus 101 that provides the predetermined video transmission service.

Then, in S703, the communication unit 501 enters a wait state for receiving a description data packet as a response to the description data acquisition request packet transmitted in S702. When the communication unit 501 receives the description data packet, the process of the reception apparatus 102 proceeds to S704, which is performed by the description data analysis unit 502.

S704, the description data analysis unit 502 performs the above-described analysis on the description data received by the communication unit 501. After S704, the process of the reception apparatus 102 proceeds to S705, which is performed by the request generation unit 503.

In S705, the request generation unit 503 determines whether there is a change in viewpoint position. Specifically, the request generation unit 503 determines whether a viewpoint position has been changed in response to receiving, by the input device 405, for example, an instruction to move a current viewpoint position to another viewpoint position from the user. If the request generation unit 503 determines that there is a change in viewpoint position, the process proceeds to S706. If the request generation unit 503 determines that there is no change in viewpoint position, the process proceeds to S707.

In S706, the request generation unit 503 generates viewpoint position information corresponding to the changed viewpoint position. After that, the process proceeds to S707.

In S707, the request generation unit 503 generates a segment acquisition request packet for a virtual viewpoint video segment. Then, the request generation unit 503 stores the generated viewpoint position information in the segment acquisition request packet. If the request generation unit 503 determines in S705 that there is no change in viewpoint position and the process proceeds to S707, the request generation unit 503 generates a segment acquisition request packet for a virtual viewpoint video segment corresponding to the unchanged viewpoint position. Viewpoint position information may not be stored in the segment acquisition request packet for the virtual viewpoint video segment corresponding to the unchanged viewpoint position. Viewpoint position information corresponding to the unchanged viewpoint position may be stored in the segment acquisition request packet for the virtual viewpoint video segment corresponding to the unchanged viewpoint position. After S707, the process of the reception apparatus 102 proceeds to S708, which is performed by the communication unit 501.

In S708, the communication unit 501 transmits the segment acquisition request packet, generated by the request generation unit 503, to the above-described transmission apparatus 101. After S708, the request generation unit 503 terminates the process in the flowchart of FIG. 7.

Figure 8:
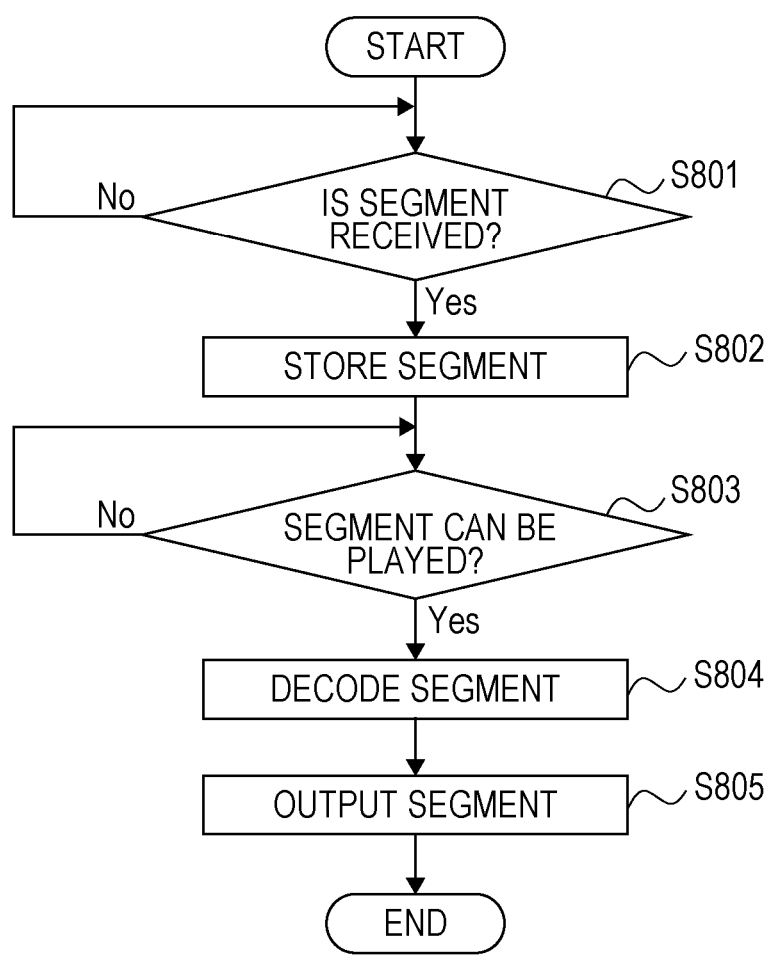
FIG. 8 is a flowchart of a virtual viewpoint video segment process in the reception apparatus.

FIG. 8 is a flowchart illustrating a virtual viewpoint video segment reception and playback process in the reception apparatus 102.

The CPU 401 of the reception apparatus 102 reads a virtual viewpoint video segment playback program stored in the ROM 402 and executes the program, thereby implementing the process illustrated in the flowchart of FIG. 8. The virtual viewpoint video segment playback program may be included in the virtual viewpoint video transmission program or the virtual viewpoint video acquisition request program or may be a program independent of these programs. In the embodiment, it is assumed that the reception apparatus 102 executes the process in the flowchart of FIG. 8 upon completion of the flowchart of FIG. 7.

In S801, the communication unit 501 is in the wait state for receiving a virtual viewpoint video segment as a response to the previously transmitted segment acquisition request packet. If the communication unit 501 receives the virtual viewpoint video segment in S801, the process of the reception apparatus 102 proceeds to S802, which is performed by the virtual viewpoint video storage unit 504.

In S802, the virtual viewpoint video storage unit 504 stores the virtual viewpoint video segment, received by the communication unit 501, in the storage device 407.

Then, in S803, the virtual viewpoint video storage unit 504 determines whether the virtual viewpoint video segment can be played. For example, if the received virtual viewpoint video segment is the first received virtual viewpoint video segment, the virtual viewpoint video storage unit 504 determines that the virtual viewpoint video segment can be played in a case where data on all of the received virtual viewpoint video segments is stored in the storage device 407. If the received virtual viewpoint video segment is the second or subsequent segment, the virtual viewpoint video storage unit 504 determines that the virtual viewpoint video segment can be played in a case where data on all of the segments is stored in the storage device 407 and playback of the preceding virtual viewpoint video segment has already been completed. Whether the virtual viewpoint video segment can be played may be determined in another way. If the virtual viewpoint video storage unit 504 determines that the virtual viewpoint segment can be played, the process of the reception apparatus 102 proceeds to S804, which is performed by the decoding unit 505.

In S804, the decoding unit 505 reads data on the virtual viewpoint video segment stored in the storage device 407 in S802, and decodes the virtual viewpoint video segment. Decoding in S804 may be performed before processing in S802. In such a case, the decoded virtual viewpoint video segment may be stored in the storage device 407. After S804, the process of the reception apparatus 102 proceeds to S805, which is performed by the output unit 506.

In S805, the output unit 506 outputs the virtual viewpoint video segment, decoded by the decoding unit 505, to the output device 406. Thus, the output device 406 displays a virtual viewpoint video. If processing in S804 is performed before processing in S802 and the decoded virtual viewpoint video segment is stored in the storage device 407, the virtual viewpoint video segment read from the storage device 407 is output to the output device 406 in S805.

Figure 9:
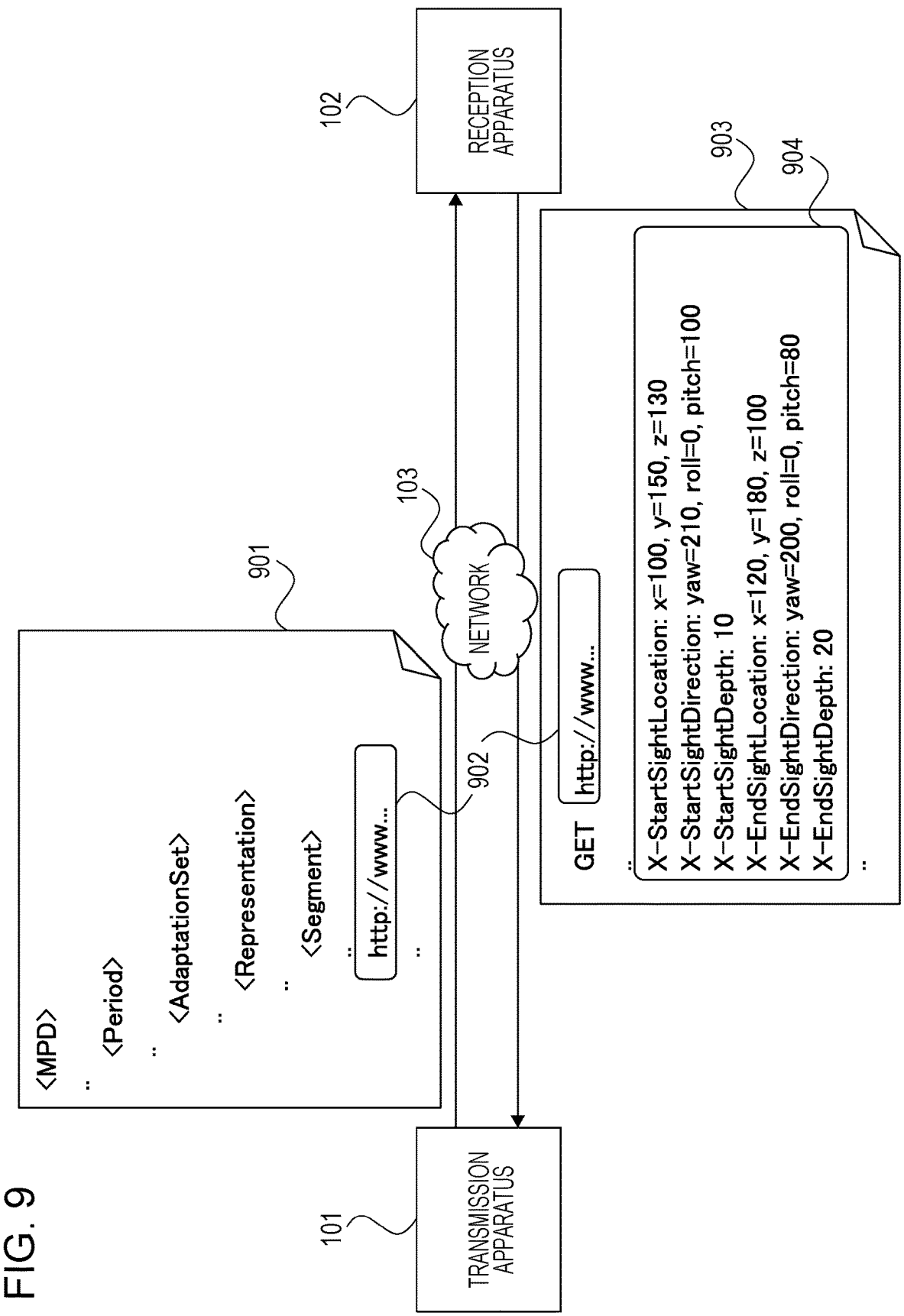
FIG. 9 is a diagram illustrating an example of acquisition of viewpoint position information using an HTTP extension header.

FIG. 9 is a diagram explaining an example of transmission and acquisition of viewpoint position information using an HTTP extension header in the communication system according to the embodiment.

The embodiment has been described with an exemplary case where a description data acquisition request for acquiring a virtual viewpoint video segment is transmitted from the reception apparatus 102 to the transmission apparatus 101 and description data as a response to the request is transmitted from the transmission apparatus 101 to the reception apparatus 102. This case is an example. Description data may be prepared in, for example, a transmission server different from the transmission apparatus 101. The reception apparatus 102 may transmit a description data acquisition request to the transmission server, and the transmission server may transmit, as a response to the request, description data to the reception apparatus 102.

In the embodiment, it is assumed that description data 901 is data based on MPEG-DASH as an example of a streaming protocol. The description data 901 may be data based on another streaming protocol. In MPEG-DASH, description data in the XML-based format, called MPD, is used. The description data describes data and information classified in a nested way. Segment information on moving images and sounds is described in a Segment tag.

In FIG. 9, a URL 902 is an access URL for acquiring a virtual viewpoint video segment described in the Segment tag. Upon acquiring the description data 901, the reception apparatus 102 selects (specifies) a virtual viewpoint video segment to be acquired based on details of the description data, and generates a virtual viewpoint video segment acquisition request 903 using the access URL 902 corresponding to the selected segment.

Then, the reception apparatus 102 transmits a packet including the virtual viewpoint video segment acquisition request 903 to the transmission apparatus 101. FIG. 9 illustrates an example of description of the virtual viewpoint video segment acquisition request 903. For an HTTP-based streaming protocol, such as MPEG-DASH or HLS, a segment acquisition request is implemented by an HTTP GET request message. A detailed description of the HTTP GET request message is omitted herein.

In the embodiment, the virtual viewpoint video segment acquisition request 903 contains viewpoint position information 904. FIG. 9 illustrates an example of description in the viewpoint position information 904. Although the embodiment illustrates a case where the viewpoint position information 904 is described in an HTTP extension header field, the viewpoint position information 904 may be included in a body or at the end of the URL. Furthermore, the viewpoint position information 904 does not need to be included in the HTTP GET request message. In the embodiment, the viewpoint position information 904 contains information on a start viewpoint position and information on an end viewpoint position.

An exemplary way of expressing viewpoint position information will now be described with reference to FIG. 10A and FIG. 10B.

Figure 10A:
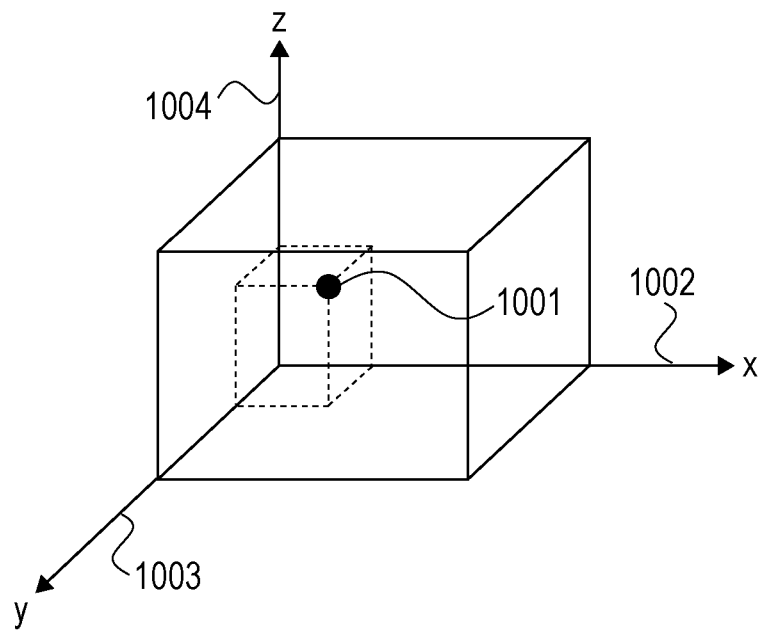
FIG. 10A is a diagram illustrating an example of expression of viewpoint position information in a three-dimensional space.

FIG. 10A is a diagram illustrating a viewpoint position in a three-dimensional space.

In FIG. 10A, a viewpoint position 1001 is expressed by using an x coordinate axis 1002, a y coordinate axis 1003, and a z coordinate axis 1004 in the three-dimensional space. Examples of expression of a viewpoint position by using these coordinate axes include the following method. A movable range, in which a viewpoint position can be moved, is previously defined for each coordinate axis, and the viewpoint position is expressed by a coordinate value ranging from 0 in the movable range. Although the viewpoint position is expressed by coordinate values in the three-dimensional space in this example, the viewpoint position may be expressed by a relative coordinate, for example, the ratio of a movement distance to a maximum movable range of 1, or may be expressed by a movement distance from a current viewpoint position.

Figure 10B:
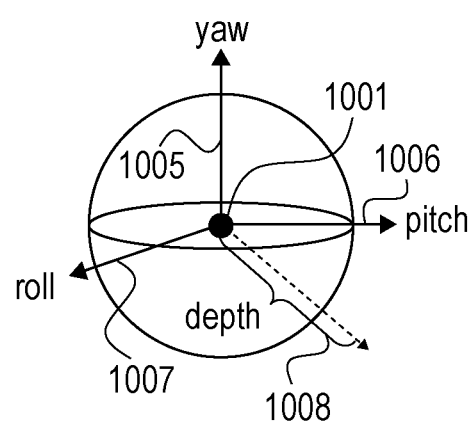
FIG. 10B is a diagram illustrating an example of expression of viewpoint position information in a three-dimensional space.

FIG. 10B is a diagram illustrating a line-of-sight direction at the viewpoint position 1001.

Referring to FIG. 10B, the viewpoint position 1001 is expressed by using a yaw axis 1005 representing the direction of a line of sight, a pitch axis 1006 representing the inclination of the line of sight, and a roll axis 1007 representing the rotation of the line of sight. In such an example illustrated in FIG. 10B, the line-of-sight direction can be freely changed by changing parameters on these three axes. Examples of expression of the line-of-sight direction include the following method. A movable angle range, in which the line-of-sight can be moved, is previously defined for each axis, and an angle from the axis can be expressed in a range of, for example, 0 degrees to 360 degrees or −180 degrees to 180 degrees. Although the line-of-sight direction is expressed by angles relative to these axes in this example, the line-of-sight direction may be expressed by, for example, relative values of angles or differences of angles from a current line-of-sight direction. Furthermore, the viewpoint position 1001 may be expressed by a depth value representing a distance 1008 to a focus position. The unit of the depth value representing the distance 1008 may be an absolute value or a relative value. All of the parameters representing, for example, the viewpoint position, the line-of-sight direction, and the focus position, do not necessarily have to be contained. Only one parameter may be contained. Two or more parameters may be combined.

In the embodiment, the above-described viewpoint position information 904 in FIG. 9 is expressed as viewpoint position information that contains all of the following parameters: a start viewpoint position and an end viewpoint position in a duration of a virtual viewpoint video segment; a line-of-sight direction at each of the viewpoint positions; and a focus position at each viewpoint position. In the example of FIG. 9, in the extension header field, the start viewpoint position is defined as X-StartSightLocation, the line-of-sight direction at the start viewpoint position is defined as X-StartSightDirection, and the focus position at the start viewpoint position is defined as X-StartSightDepth. In addition, the end viewpoint position is defined as X-EndSightLocation, the line-of-sight direction at the end viewpoint position is defined as X-EndSightDirection, and the focus position at the end viewpoint position is defined as X-EndSightDepth.

Therefore, in the embodiment, upon receiving the virtual viewpoint video segment acquisition request 903, the transmission apparatus 101 encodes a virtual viewpoint video corresponding to the above-described viewpoint position information 904, generates a virtual viewpoint video segment, and transmits the generated segment to the reception apparatus 102.

As described above, the transmission apparatus 101 in the embodiment receives viewpoint position information in addition to a virtual viewpoint video acquisition request from the reception apparatus 102, and transmits a virtual viewpoint video segment encoded as a two-dimensional video based on the received viewpoint position information. Therefore, according to the embodiment, it is unnecessary to transmit the whole of a virtual viewpoint video, from which two-dimensional videos from different viewpoint positions can be reproduced. This suppresses an increase in amount of data to be transmitted when a virtual viewpoint video is transmitted. Furthermore, according to the embodiment, the reception apparatus does not need to have a function or capability to reproducing virtual viewpoint videos as two-dimensional videos from different viewpoint positions. In other words, according to the embodiment, an increase in amount of data to be transmitted is suppressed, the reception apparatus does not need to have a function or capability to reproducing virtual viewpoint videos as two-dimensional videos from different viewpoint positions, and a virtual viewpoint video in which the user can freely change their viewpoint position can be transmitted.

Second Embodiment

The first embodiment has been described with the case where upon receiving a virtual viewpoint video segment acquisition request containing viewpoint position information from the reception apparatus 102, the transmission apparatus 101 transmits a virtual viewpoint video segment corresponding to its viewpoint position. Therefore, when the viewpoint position is changed in the reception apparatus 102, or when the viewpoint is moved, the reception apparatus 102 can acquire a virtual viewpoint video responsive to the viewpoint movement. For example, if it takes long time to encode a virtual viewpoint video segment reflecting viewpoint movement in the transmission apparatus 101, such long processing time may delay transmission of the segment, stopping playback of a virtual viewpoint video in the reception apparatus 102.

The second embodiment will be described with an exemplary case where playback of a virtual viewpoint video is prevented from being stopped in the reception apparatus 102 by performing encoding so that viewpoint movement is allowed in a segment following a virtual viewpoint video segment that is a response to a virtual viewpoint video segment acquisition request containing viewpoint position information.

Specifically, according to the second embodiment, a segment to be transmitted subsequent to a segment that is a response to a virtual viewpoint video segment acquisition request is generated in advance in the transmission apparatus 101 so that transmission of the virtual viewpoint video segment is prevented from being delayed even if viewpoint movement is requested. Hardware configurations and functional configurations in the second embodiment are substantially the same as those in the foregoing first embodiment, and an illustration and description of these configurations is omitted herein.

Figure 11:
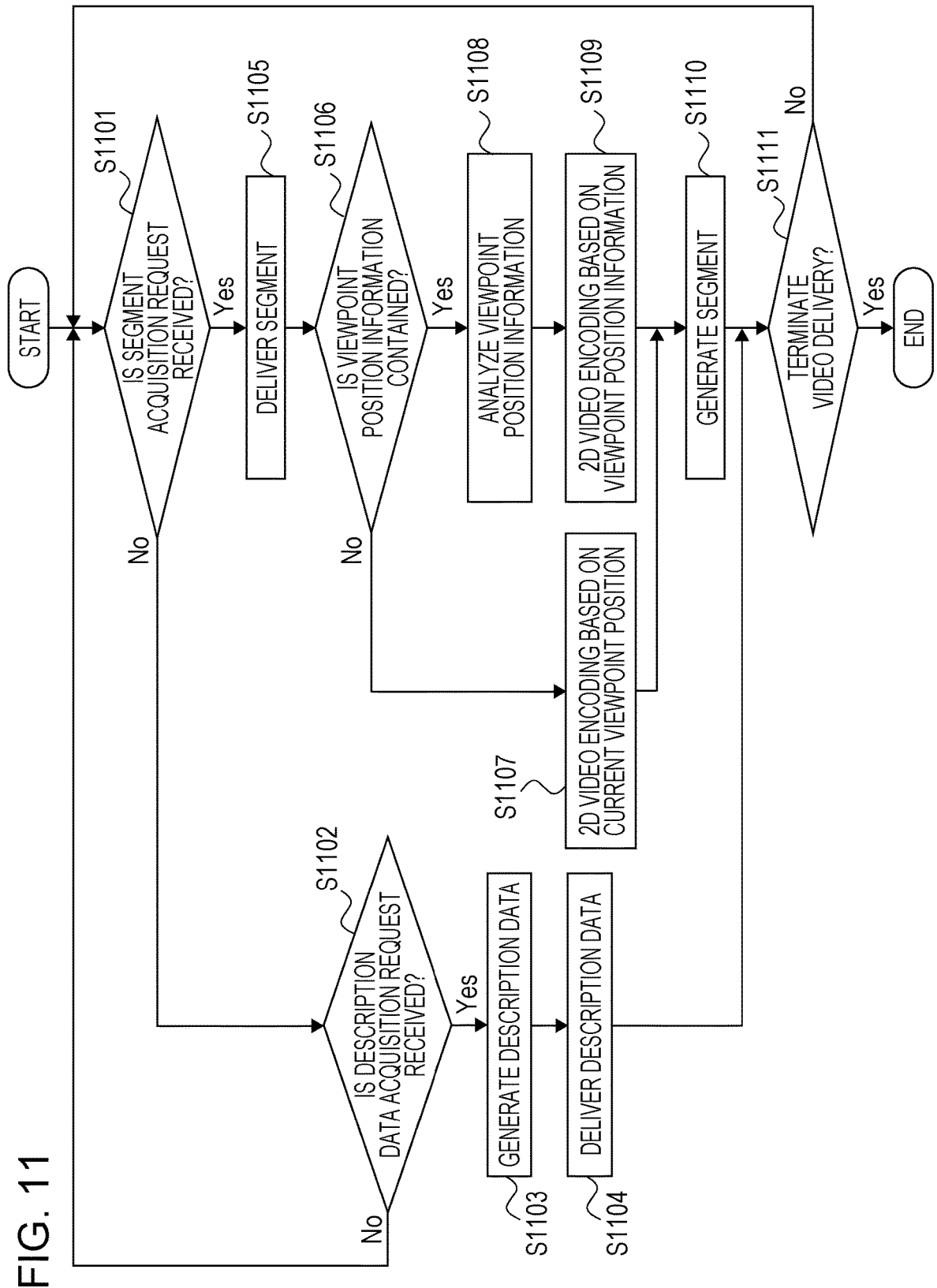
FIG. 11 is a flowchart of a virtual viewpoint video transmission process in the transmission apparatus in a second embodiment.

FIG. 11 is a flowchart illustrating a virtual viewpoint video segment transmission process in the transmission apparatus 101 in the second embodiment.

The process illustrated in the flowchart of FIG. 11 will be described below with reference to the functional blocks of the transmission apparatus 101 illustrated in FIG. 3.

In S1101, the request processing unit 302 determines whether a received request packet is a segment acquisition request packet. If the request processing unit 302 determines that it is a segment acquisition request packet, the process of the transmission apparatus 101 proceeds to S1105. If the request processing unit 302 determines that it is not a segment acquisition request packet, the process proceeds to S1102. Since processing in S1102 to S1104 is the same such as that in S602 to S604 in FIG. 6, a description thereof is omitted. After S1104, the process of the transmission apparatus 101 proceeds to S1111.

In S1105, in a case where a virtual viewpoint video segment previously generated by processing in S1106 to S1110, which will be described later, has not yet been transmitted and it is determined in S1111, which will be described later, to continue video transmission, the communication unit 301 transmits the virtual viewpoint video segment to the reception apparatus 102. After S1105, the process of the transmission apparatus 101 proceeds to S1106, which is performed by the request processing unit 302.

In S1106, the request processing unit 302 determines whether viewpoint position information is contained in the segment acquisition request packet determined in S1101. If the request processing unit 302 determines that viewpoint position information is contained, the process of the transmission apparatus 101 proceeds to S1108, which is performed by the viewpoint position information analysis unit 304. If the request processing unit 302 determines that viewpoint position information is not contained, the process of the transmission apparatus 101 proceeds to S1107, which is performed by the encoding unit 305.

In S1107, the encoding unit 305 performs two-dimensional video encoding on a virtual viewpoint video associated with a current viewpoint position, or the last viewpoint position in a virtual viewpoint video segment transmitted most recently to the reception apparatus 102. If there is no change in viewpoint position in S1107 as in S606 in FIG. 6 described above, two-dimensional video encoding may be performed in advance. After S1107, the process of the transmission apparatus 101 proceeds to S1110, which is performed by the segment generation unit 307.

When the process proceeds to S1108, the viewpoint position information analysis unit 304 analyzes the viewpoint position information received in S1101. In the second embodiment, the viewpoint position information analysis unit 304 performs analysis based on the analyzed viewpoint position information to compute a viewpoint position of a virtual viewpoint video to be transmitted next. For example, the viewpoint position information analysis unit 304 computes a start viewpoint position and an end viewpoint position of a virtual viewpoint video segment to be transmitted next from at least one of the viewpoint position information contained in the received virtual viewpoint video segment acquisition request and an end viewpoint position of the most recently transmitted virtual viewpoint video segment. After S1108, the process of the transmission apparatus 101 proceeds to S1109, which is performed by the encoding unit 305.

In S1109, the encoding unit 305 performs two-dimensional video encoding on a virtual viewpoint video based on the viewpoint positions analyzed by the viewpoint position information analysis unit 304. In the second embodiment, in S1109, the encoding unit 305 performs two-dimensional video encoding on a virtual viewpoint video at the next viewpoint position based on viewpoint movement analyzed by the viewpoint position information analysis unit 304, that is, a virtual viewpoint video to be transmitted next. After S1109, the process of the transmission apparatus 101 proceeds to S1110.

In S1110, the segment generation unit 307 generates a virtual viewpoint video segment based on the virtual viewpoint video encoded by the encoding unit 305 in S1107 or S1109. Specifically, in the present embodiment, when the virtual viewpoint video to be transmitted next is subjected to two-dimensional video encoding in S1109, the segment generation unit 307 generates a virtual viewpoint video segment to be transmitted next. After that, the process of the transmission apparatus 101 proceeds to S1111. Since the same processing such as that in S611 in FIG. 6 is performed in S1111, a description thereof is omitted. After S1111, the process of the transmission apparatus 101 returns to S1101.

Although the virtual viewpoint video segment corresponding to a viewpoint position next to the received viewpoint position information is generated in the above-described exemplary case, a plurality of virtual viewpoint video segments corresponding to a plurality of viewpoint positions, such as the viewpoint position next to the viewpoint position indicated by the received viewpoint position information and a viewpoint position after the next viewpoint position, may be generated in advance.

Figure 12:
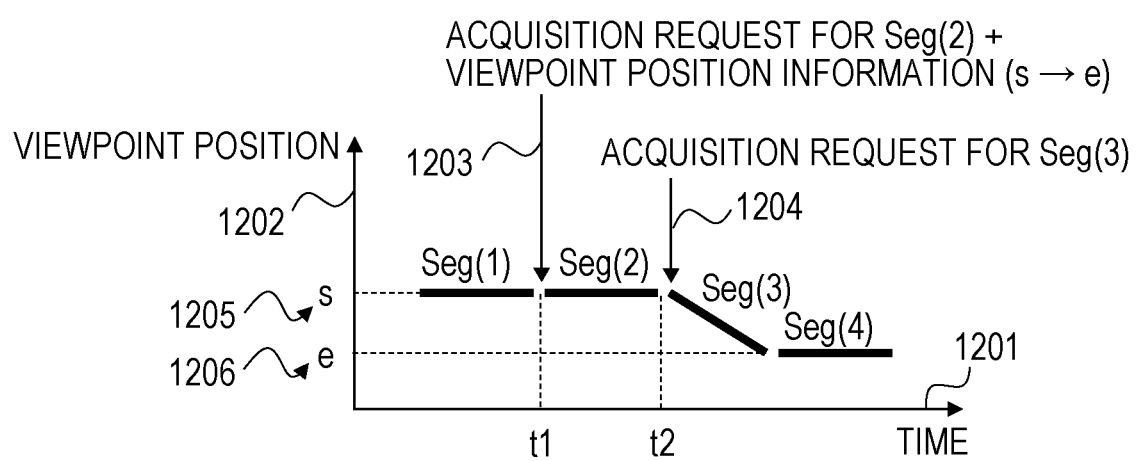
FIG. 12 is a graph illustrating a relationship on a time axis between acquisition requests and segments.

FIG. 12 is a diagram illustrating a relationship on a time axis 1201 between virtual viewpoint video segment acquisition requests, a viewpoint position 1202 that changes depending on viewpoint movement, and a virtual viewpoint video segment that reflects the viewpoint movement.

In FIG. 12, Seg(x) (x=1, 2, 3, 4 in an example of FIG. 12) denotes a virtual viewpoint video segment. An arrow of a segment acquisition request 1203 indicates time at which acquisition of a virtual viewpoint video segment Seg(2) is requested. An arrow of a segment acquisition request 1204 indicates time at which acquisition of a virtual viewpoint video segment Seg(3) is requested.

In the case illustrated in FIG. 12, it is assumed that the segment acquisition request 1203 for the virtual viewpoint video segment Seg(2) contains viewpoint position information, a start viewpoint position 1205 indicated by the viewpoint position information corresponds to a position s in FIG. 12, and an end viewpoint position 1206 indicated by the viewpoint position information corresponds to a position e in FIG. 12. Specifically, in the case illustrated in FIG. 12, the viewpoint position moves from the start viewpoint position 1205 (position s) to the end viewpoint position 1206 (position e). FIG. 12 illustrates an exemplary virtual viewpoint video in which viewpoint movement speed is constant and the viewpoint gradually moves.

In the second embodiment, the viewpoint position information contained in the segment acquisition request 1203 for the virtual viewpoint video segment Seg(2) is reflected in the next virtual viewpoint video segment Seg(3). In other words, during a period from time t1 to time t2 after transmission of the virtual viewpoint video segment Seg(2), encoding is performed to generate the virtual viewpoint video segment Seg(3) responsive to viewpoint movement from the start viewpoint position 1205 (position s) to the end viewpoint position 1206 (position e).

Although FIG. 12 illustrates the case where the viewpoint position moves at constant speed during a duration of the virtual viewpoint video segment Seg(3), viewpoint movement time may be zero. For example, if the viewpoint moves a large distance, the viewpoint may be switched from a position to another position without moving at constant speed. For viewpoint position switching, virtual viewpoint video switching is allowed in a virtual viewpoint video segment that is a response to the next segment acquisition request. In a case where the above-described switching is performed, encoding may be performed in advance.

For example, if the viewpoint position is changed during playback of a virtual viewpoint video segment in the reception apparatus 102, viewpoint position information on the changed viewpoint position may be transmitted to the transmission apparatus 101. In such a case, the transmission apparatus 101 transmits, based on the most recently virtual viewpoint video segment, a virtual viewpoint video segment corresponding to the changed viewpoint position. If the viewpoint position is changed during playback as described above, the virtual viewpoint video segment corresponding to the changed viewpoint position may be encoded as a segment having a duration shorter than a predefined duration of a normal segment, thus reducing time delay caused by viewpoint switching.

As described above, in the second embodiment, the transmission apparatus 101 is configured to cause viewpoint movement based on viewpoint position information contained in a segment acquisition request to be reflected in a segment following a virtual viewpoint video segment that is a response to the segment acquisition request. Such a configuration in this embodiment can reduce a possibility that, for example, if it takes a long time to encode a segment in the transmission apparatus 101, playback of a virtual viewpoint video may be stopped in the reception apparatus 102.

Other Embodiments

Although the above embodiments have been described with the case where viewpoint position information is transmitted to the transmission apparatus 101, the viewpoint position information may contain scenario information for generating a virtual viewpoint video in which the viewpoint is sequentially switched between a plurality of positions in an order intended by, for example, a user of the reception apparatus 102. Furthermore, information indicating a region of interest (ROI), such as an object, may be transmitted as well as the viewpoint position information to the transmission apparatus 101. The transmission apparatus 101 may generate and transmit a virtual viewpoint video segment based on the information indicating the ROI. Assuming that, for example, a face object is used as an object in an ROI, a virtual viewpoint video segment based on viewpoint movement in which the face object is identified such that the face is viewed from the front at all times may be transmitted.

The present invention can be implemented by processing of supplying a program for implementing one or more functions of the above-described embodiments to a system or apparatus via a network or storage medium, and causing one or more processors in the computer of the system or apparatus to read out and execute the program. The present invention can also be implemented by a circuit (for example, an ASIC) for implementing one or more functions.

It is to be understood that the above-described embodiments are intended to merely illustrate specific examples for implementing the present invention, and should not be construed as limiting the technical scope of the present invention. In other words, the present invention can be implemented in various forms without departing from technical idea or main features of the present invention.

The present invention is not limited to the above embodiments and various changes and modifications can be made within the spirit and scope of the present invention. Therefore, to apprise the public of the scope of the present invention, the following claims are made.

According to the embodiment, an increase in amount of transmission data related to a virtual viewpoint video can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus for transmitting a virtual viewpoint video, comprising:
   one or more memories storing instructions; and
   one or more processors which, when executing the instructions, cause the communication apparatus to perform:
   sending description data describing URLs for acquiring virtual viewpoint video segments, to a receiving apparatus;
   receiving, from the receiving apparatus, an acquisition request by using a URL selected from the described URLs for a virtual viewpoint video segment corresponding to the selected URL;
   acquiring, from the receiving apparatus, viewpoint position information indicating a start viewpoint position and an end viewpoint position in a duration of the corresponding virtual viewpoint video segment;
   generating the corresponding virtual viewpoint video segment as a two-dimensional video segment from data of a three-dimensional model, based on the start viewpoint position and the end viewpoint position in a duration; and
   transmitting the corresponding virtual viewpoint video segment as a two-dimensional video segment to the receiving apparatus.

2. The communication apparatus according to claim 1, wherein the one or more processors, when executing the instructions, further cause the communication apparatus to perform:
   generating description data describing information for acquiring a virtual viewpoint video; and
   transmitting the description data,
   wherein the acquisition request received is an acquisition request based on the transmitted description data.

3. The communication apparatus according to claim 1, wherein the viewpoint position information is contained in the acquisition request.

4. The communication apparatus according to claim 1, wherein in the acquiring, the start viewpoint position and the end viewpoint position of the virtual viewpoint video segment are acquired from at least one of the viewpoint position information and an end viewpoint position of a virtual viewpoint video segment transmitted most recently.

5. The communication apparatus according to claim 1, wherein the one or more processors, when executing the instructions, further cause the communication apparatus to perform, based on the start viewpoint position and the end viewpoint position of the virtual viewpoint video, a virtual viewpoint video corresponding to the acquisition request.

6. The communication apparatus according to claim 5, wherein, in the encoding, encoded is a virtual viewpoint video with constant-speed viewpoint movement in the duration of the virtual viewpoint video segment based on the start viewpoint position and the end viewpoint position.

7. The communication apparatus according to claim 6, wherein, in the encoding, a virtual viewpoint video with viewpoint movement in the duration of the virtual viewpoint video segment based on a speed of the viewpoint movement or a distance of the viewpoint movement is encoded.

8. The communication apparatus according to claim 1, wherein the viewpoint position information contains coordinates, a line-of-sight direction, and a focal length in a three-dimensional space of at least one of a start viewpoint position and an end viewpoint position in a duration of the virtual viewpoint video segment.

9. The communication apparatus according to claim 1, wherein the viewpoint position information contains coordinates in a three-dimensional space, a line-of-sight direction, and a focal length of a start viewpoint position in a duration of the virtual viewpoint video segment, and at least one of a viewpoint movement speed and a viewpoint movement distance.

10. The communication apparatus according to claim 1, wherein in a case where the viewpoint position information is acquired in a duration of the virtual viewpoint video segment, a virtual viewpoint video segment having a duration shorter than a predefined duration is transmitted.

11. The communication apparatus according to claim 1, wherein
   in the acquiring, information indicating at least viewpoint position switching is acquired as the viewpoint position information, and
   in the transmitting, the virtual viewpoint video segment corresponding to a viewpoint position indicated by the scenario information is transmitted.

12. A method that is executed by a communication apparatus for transmitting a virtual viewpoint video, comprising:
   sending description data describing URLs for acquiring virtual viewpoint video segments, to a receiving apparatus;
   receiving, from the receiving apparatus, an acquisition request by using a URL selected from the described URLs for a virtual viewpoint video segment corresponding to the selected URL;
   acquiring, from the receiving apparatus, viewpoint position information indicating a start viewpoint position and an end viewpoint position in a duration of the corresponding virtual viewpoint video segment;
   generating the corresponding virtual viewpoint video segment as a two-dimensional video segment from data of a three-dimensional model, based on the start viewpoint position and the end viewpoint position in a duration; and
   transmitting the corresponding virtual viewpoint video segment as a two-dimensional video segment to the receiving apparatus.

13. A non-transitory computer-readable storage medium that stores a program that causes, when executed by a computer included in a communication apparatus for transmitting a virtual viewpoint video, the communication apparatus to:
- send description data describing URLs for acquiring virtual viewpoint video segments, to a receiving apparatus;
- receive, from the receiving apparatus, an acquisition request by using a URL selected from the described URLs for a virtual viewpoint video segment corresponding to the selected URL;
- acquire, from the receiving apparatus, viewpoint position information indicating a start viewpoint position and an end viewpoint position in a duration of the corresponding virtual viewpoint video segment;
- generate the corresponding virtual viewpoint video segment as a two-dimensional video segment from data of a three-dimensional model, based on the start viewpoint position and the end viewpoint position in a duration; and
- transmit the corresponding virtual viewpoint video segment as a two-dimensional video segment to the receiving apparatus.

* * * * *